United States Patent
Feng et al.

(10) Patent No.: US 11,800,471 B2
(45) Date of Patent: *Oct. 24, 2023

(54) DEVICE TO DEVICE SYNCHRONIZATION SOURCE SELECTION

(71) Applicant: Sun Patent Trust, New York, NY (US)

(72) Inventors: Sujuan Feng, Frankfurt (DE); Lilei Wang, Beijing (CN); Hidetoshi Suzuki, Kanagawa (JP); Prateek Basu Mallick, Hessen (DE)

(73) Assignee: Sun Patent Trust, New York, NY (US)

( * ) Notice: Subject to any disclaimer, the term of this patent is extended or adjusted under 35 U.S.C. 154(b) by 326 days.

This patent is subject to a terminal disclaimer.

(21) Appl. No.: 17/114,123

(22) Filed: Dec. 7, 2020

(65) Prior Publication Data

US 2021/0092701 A1    Mar. 25, 2021

Related U.S. Application Data

(63) Continuation of application No. 16/189,808, filed on Nov. 13, 2018, now Pat. No. 10,887,854, which is a
(Continued)

(51) Int. Cl.
*H04W 56/00* (2009.01)
*H04B 7/155* (2006.01)
*H04B 17/309* (2015.01)

(52) U.S. Cl.
CPC ... *H04W 56/0015* (2013.01); *H04W 56/0025* (2013.01); *H04B 7/15507* (2013.01); *H04B 17/309* (2015.01)

(58) Field of Classification Search
CPC ......... H04W 56/0015; H04W 56/0025; H04W 56/004; H04B 7/15507; H04B 17/309
See application file for complete search history.

(56) References Cited

U.S. PATENT DOCUMENTS 7,773,578 B2   8/2010 Liu
8,213,405 B2   7/2012 Hom et al.
(Continued)

FOREIGN PATENT DOCUMENTS

CN   101465707 A   6/2009
CN   101983532 A   3/2011
(Continued)

OTHER PUBLICATIONS

Japanese Office Action, dated Oct. 13, 2020, for Japanese Application No. 2019-231632, 4 pages. (with English machine translation).
(Continued)

*Primary Examiner* — Hanh N Nguyen
(74) *Attorney, Agent, or Firm* — Seed IP Law Group LLP

(57) ABSTRACT

The present invention relates to selection of synchronization source among various synchronization sources which include sources determining the synchronization signal from the network such as base stations (network nodes) or user equipments which receive the synchronization signal possibly over other hops from the base station, and which further includes sources which do not determine their synchronization signal from the network. The selection of the synchronization source is performed by choosing the source with the most reliable synchronization signal based on a metric calculated for each of the sources considered. In particular, the metric is based on the type of the source, number of hops between the network and the source and/or received signal quality. After selecting the source, the timing of the device is adapted accordingly.

14 Claims, 8 Drawing Sheets

Related U.S. Application Data continuation of application No. 15/309,401, filed as application No. PCT/CN2014/077130 on May 9, 2014, now Pat. No. 10,165,533.

(56) References Cited

U.S. PATENT DOCUMENTS

| | | | |
|---|---|---|---|
| 8,954,104 B2* | 2/2015 | Parkvall | H04W 56/0035 |
| | | | 455/524 |
| 9,379,856 B2* | 6/2016 | Khoryaev | H04W 72/082 |
| 9,826,494 B2 | 11/2017 | Chen et al. | |
| 9,872,266 B2* | 1/2018 | Chae | H04W 56/001 |
| 10,117,200 B2* | 10/2018 | Chae | H04W 52/04 |
| 10,165,533 B2* | 12/2018 | Feng | H04W 56/0025 |
| 10,887,854 B2* | 1/2021 | Feng | H04W 56/0025 |
| 2008/0069032 A1 | 3/2008 | Liu | |
| 2008/0165761 A1 | 7/2008 | Goppner et al. | |
| 2009/0196277 A1 | 8/2009 | Horn et al. | |
| 2011/0310754 A1 | 12/2011 | Laursen et al. | |
| 2012/0077502 A1 | 3/2012 | Liu | |
| 2014/0050153 A1 | 2/2014 | Iwamura et al. | |
| 2015/0327201 A1 | 11/2015 | He et al. | |
| 2017/0142741 A1 | 5/2017 | Kaur et al. | |
| 2019/0069255 A1* | 2/2019 | Zhao | H04W 56/00 |

FOREIGN PATENT DOCUMENTS

| | | |
|---|---|---|
| CN | 102625438 A | 8/2012 |
| EP | 1 553 735 A1 | 7/2005 |
| JP | 2011-514716 A | 5/2011 |
| JP | 2012-512579 A | 5/2012 |
| JP | 2012-525741 A | 10/2012 |
| JP | 2012-244425 A | 12/2012 |
| JP | 6646860 B2 | 2/2020 |
| RU | 2 476 996 C2 | 2/2013 |
| WO | 2006/005229 A1 | 1/2006 |
| WO | 2009/099809 A2 | 8/2009 |
| WO | 2010/069332 A1 | 6/2010 |

OTHER PUBLICATIONS

3GPP TR 25.913 V9.0.0, "3rd Generation Partnership Project; Technical Specification Group Radio Access Network; Requirements for Evolved UTRA (E-UTRA) and Evolved UTRAN (E-UTRAN) (Release 9)," Dec. 2009, 18 pages.
3GPP TR 36.843 V12.0.1, "3rd Generation Partnership Project; Technical Specification Group Radio Access Network, Study on LTE Device to Device Proximity Services; Radio Aspects (Release 12)," Mar. 2014, 50 pages.
3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.
3GPP TS 36.211 V9.0.0, "3rd Generation Partnership Project; Technical Specification Group Radio Access Network; Evolved Universal Terrestrial Radio Access (E-UTRA); Physical Channels and Modulation (Release 9)," Dec. 2009, 85 pages.
3GPP TS 36.211 V12.1.0, "3rd Generation Partnership Project; Technical Specification Group Radio Access Network; Evolved Universal Terrestrial Radio Access (E-UTRA); Physical Channels and Modulation (Release 12)," Mar. 2014, 120 pages.
3GPP TS 36.331 V12.1.0, "3rd Generation Partnership Project; Technical Specification Group Radio Access Network; Evolved Universal Terrestrial Radio Access (E-UTRA); Radio Resource Control (RRC); Protocol specification (Release 12)," Mar. 2014, 365 pages.
Brazilian Office Action, dated May 25, 2020, for Brazilian Application No. BR112016023592-4, 5 pages.
Extended European Search Report, dated Dec. 13, 2017, for related European Patent Application No. 14891563.0-1875 / 3140931, 11 pages.
International Search Report dated Feb. 13, 2015, for corresponding International Application No. PCT/CN2014/077130, 2 pages.
Institute for Information Industry (III), "Performance of D2D synchronization source selection and D2DSS transmission," R1-141498, Agenda item: 7.2.7.3.3, 3GPP TSG-RAN WG1 Meeting #76bis, Shenzhen, China, Mar. 31-Apr. 4, 2014, 5 pages.
InterDigital, "Synchronization procedures for D2D," R1-141562, Agenda item: 7.2.7.3.3, 3GPP TSG-RAN WG1 Meeting #76bis, Shenzhen, China, Mar. 31-Apr. 4, 2014, 4 pages.
Japanese Office Action, dated Aug. 20, 2019, for Japanese Application No. 2018-206741, 7 pages, (with English translation).
LG Electronics, "Discussion on D2D Synchronization Procedure," R1-140330, 3GPP TSG RAN WG1 Meeting #76, Agenda Item: 7.2.8.1.1, Prague, Czech Republic, Feb. 10-14, 2014, 7 pages.
LG Electronics, "On the Design of D2DSS and PD2DSCH", R1-140329, 3GPP TSG RAN WG1 Meeting #76, Agenda item: 7.2.8.1.1, Prague, Czech, Feb. 10-14, 2014, 6 pages.
Notice of Reasons for Rejection, dated Mar. 30, 2018, for the corresponding Japanese Application No. 2016-566991, 10 pages. (With English Translation).
Panasonic, "Rough synchronization procedure in D2D," R1-141220, 3GPP TSG RAN WG1 Meeting #76bis, Agenda Item: 7.2.7.3.3, Shenzhen, China, Mar. 31-Apr. 4, 2014, 5 pages.
Russian Office Action, dated Sep. 6, 2017, for Russian Application No. 2016143093/07(068964), 8 pages (with English translation).
Russian Search Report, dated Sep. 6, 2017, for Russian Application No. 2016143093/07(068964), 4 pages (with English translation).
Sesia et al., "LTE the UMTS Long Term Evolution—From Theory to Practice," Wiley, 2011, Chapter 18, 19 pages.
Sony, "Procedure and open issues for Discovery Type 1 and 2b,"R2-141299, Agenda item: 7.4.3, 3GPP TSG-RAN WG2 Meeting #85bis, Valencia, Spain, Mar. 30-Apr. 4, 2014, 5 pages.
Chinese Office Action, dated Mar. 31, 2022, for Chinese Application No. 202010716180.9, 7 pages. (English translation).
LG Electronics, "Discussion on D2D synchronization procedure," R1-141358, Agenda item: 7.2.7.3.3, 3GPP TSG RAN WG1 Meeting #76bis, Shenzhen, China, Mar. 31-Apr. 4, 2014, 5 pages.

* cited by examiner

DEVICE TO DEVICE SYNCHRONIZATION SOURCE SELECTION

The present invention relates apparatuses and methods for selecting or reselecting of the synchronization source for wireless communications.

BACKGROUND OF THE INVENTION

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive. In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support into the next decade. The ability to provide high bit rates is a key measure for LTE. The work item (WI) specification on Long-Term Evolution (LTE) called Evolved UMTS Terrestrial Radio Access (UTRA) and UMTS Terrestrial Radio Access Network (UTRAN) is finalized as Release 8 (Rel. 8 LTE). The LTE system represents efficient packet-based radio access and radio access networks that provide full IP-based functionalities with low latency and low cost. The detailed system requirements are given in 3GPP specification TR 25.913, "Requirements for Evolved UTRA and Evolved UTRAN", ver.9.0.0, freely available at www.3gpp.org.

In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

The overall architecture is shown in FIG. 1 and a more detailed representation of the E-UTRAN architecture is given in FIG. 2. The E-UTRAN comprises eNBs, providing the E-UTRA user plane (PDCP/RLC/MAC/PHY) and control plane (RRC) protocol terminations towards the UE. The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMES/Serving Gateways and eNBs. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g., parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the SGW for a UE at the initial attach and at the time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the Sha interface towards the home HSS for roaming UEs.

The downlink component carrier of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a given number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective $N_{RB}^{DL} \times N_{sc}^{RB}$ subcarriers as also shown in FIG. 3.

Assuming a multi-carrier communication system, e.g., employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 3. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see, for example, 3GPP TS 36.211, "Evolved Universal Terrestrial Radio Access (E-UTRA); Physical Channels and Modulation (Release 8)", version 8.9.0 or 9.0.0, section 6.2, available free of charge at http://www.3gpp.org and incorporated herein by reference). The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Cell search procedures are the first set of tasks performed by a mobile device in a cellular system after initial power-up. It is only after the search and registration procedures that a mobile device is able to receive and initiate voice and data calls. A typical cell search procedure in LTE may involve a combination of carrier frequency determination, timing synchronization and identification of unique cell identifier. These procedures are typically facilitated by specific synchronization signals transmitted by the base station (BTS). However, these synchronization signals are not continuously used in connected modes for a mobile device. Hence, only minimum resources in terms of power, subcarrier allocation and time slice are allocated for synchronization signals.

The cell search procedure enables the UE to determine the time and frequency parameters which are necessary to demodulate the downlink and to transmit uplink signals with the correct timing. The first phase of the cell search includes an initial synchronization. Accordingly, the UE detects an LTE cell and decodes all the information required for registering to the detected cell. The procedure makes use of two physical signals which are broadcast in the central 62 subcarriers of each cell, the primary and secondary synchronization signals (PSS and SSS, respectively). These signals enable time and frequency synchronization. Their successful detection provides a UE with the physical cell-ID, cyclic prefix length, and information as to whether FDD or TDD is employed. In particular, in LTE, when a terminal is switched on, it detects the primary synchronization signal, which for FDD is transmitted in the last OFDM symbol of the first time slot of the first subframe (subframe 0) in a radio frame (for TDD the location is slightly different, but still well-determined). This enables the terminal to acquire the slot boundary independently of the chosen cyclic prefix selected for the cell. After the mobile terminal has found the 5 millisecond timing (slot boundaries), the secondary synchronization signal is looked for. Both the PSS and SSS are transmitted on 62 of the 72 reserved subcarriers around the DC carrier. In the next step, the UE shall detect a physical broadcast channel (PBCH) which, similarly to the PSS and SSS, is mapped only to the central 72 subcarriers of a cell. The PBCH contains the Master Information Block (MIB) including information about the system resources. In LTE up to Release 10, MIB had a length of 24 bits (14 bits of which are currently used and 10 bits are spare). MIB includes information concerning the downlink system bandwidth, physical HARQ Indicator Channel (PHICH) structure, and 8 most significant bits of the System Frame Number (SFN).

After successful detection of the master information block (MIB), which includes a limited number of the most frequently transmitted parameters essential for initial access to the cell, the terminal activates the system bandwidth, meaning that it has to be able to receive and detect signals across the indicated downlink system bandwidth. After acquiring the downlink system bandwidth, the UE may proceed with receiving further required system information on the so-called System Information Blocks (SIB). In LTE Release 10, SIB Type 1 to SIB Type 13 are defined, carrying different information elements required for certain operations. For instance, in case of FDD the SIB Type 2 (SIB2) includes the UL carrier frequency and the UL bandwidth. The various SIBs are transmitted on a Physical Downlink Shared Channel (PDSCH) and thus (cf. details to PDSCH and PDCCH below) the respective allocations are assigned by a Physical Downlink Control Channel (PDCCH). Before the terminal (UE) is able to correctly detect such (or any) PDCCH, it needs to know the downlink system bandwidth from the MIB.

The above-mentioned cell identity (cell-ID) will identify the cell uniquely within the PLMN. The cell identity is a global cell-ID that is used to identify the cell from an Operation and Maintenance (OAM) perspective. It is transmitted in the System Information and is designed for eNodeB management within the core network. The global cell identity is also used for UE to identify a specific cell in terms of RRC/NAS layer processing. Physical cell identity is the cell identity at physical layer. The physical cell identity has a range of 0 to 503, and is used to scramble the data to help the mobile separate information from the different transmitters. A physical cell identity (cell-ID) will determine the primary and secondary synchronization signal sequence. It is similar to the Scrambling Codes from UMTS. There are 504 unique physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group.

Synchronization signal is composed of a primary synchronization signal (PSS) and secondary synchronization signal (SSS). The sequence used for the primary synchronization signal is generated from a frequency-domain Zadoff-Chu sequence according to $N_{ID}^{(2)}$. By detecting primary synchronization signal, $N_{ID}^{(2)}$ could be detected. The sequence used for the second synchronization signal is an interleaved concatenation of two binary sequences with a length of 31 bits. The concatenated sequence is scrambled with a scrambling sequence given by the primary synchronization signal. The SSS sequences are based on maximum length sequences, known as M-sequences, which can be created b cycling through every possible state of a shift register of length n. This results in a sequence of length $2^n-1$. In particular, the two 31-bit long binary sequences to be concatenated are such M-sequences. For further details on the primary and secondary synchronization signal, see, for example, 3GPP TR 36.211, "Evolved Universal Terrestrial Radio Access (E-UTRA); Physical Channels and Modulation (Release 12)", version 12.1.0, section 6.11, available free of charge at http://www.3gpp.org and incorporated herein by reference.

After receiving the PPS and SSS, the timing is adapted by the receiving UE. In particular, the UE synchronizes its receiver to the downlink transmission received from the synchronization source (eNB). Then, the uplink timing is adjusted. This is performed by applying a time advance at the UE transmitter, relative to the received downlink timing, in order to compensate for propagation delays varying for different UEs. The timing advance procedure is described concisely in Section 18.2.2 of the book "LTE The UMTS Long Term Evolution: From theory to practice", $2^{nd}$ edition, ed. By S. Sesia, I. Toufik, M. Baker, Wiley, 2011.

Proximity-based applications and services represent an emerging social-technological trend. Current and intended uses include services related to commercial services and Public Safety that would be of interest to operators and users. The introduction of a Proximity Services (ProSe) capability in LTE would allow the 3GPP industry to serve this developing market, and will, at the same time, serve the urgent needs of several Public Safety communities that are jointly committed to LTE.

Device-to-Device (D2D) communication is a technology component for LTE-A, Release 12. The Device-to-Device (D2D) communication technology allows D2D as an underlay to the cellular network to increase the spectral efficiency. For example, if the cellular network is LTE, all data carrying physical channels use SC-FDMA for D2D signaling. The "D2D communication in LTE" is focusing on two areas; Discovery and Communication. In D2D communication, UEs transmit data signals to each other over a direct link using the cellular resources instead of through a base station (BS, eNodeB, eNB). D2D users communicate directly but may remain controlled under the network, i.e., at least when being in coverage of an eNB. Therefore D2D can improve system performances by reusing cellular resources. It is currently assumed that D2D operates in uplink LTE spectrum (in the case of FDD) or uplink subframes of the cell giving coverage (in case of TDD except when out of coverage). Furthermore D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible. Further current working assumptions concerning the radio access for D2D of LTE are described in 3GPP TS 36.843, v c.0.1, "Study on LTE Device to Device Proximity Services; Radio Aspects" (in the following referred to as "TS 36.843"), freely available at www.3gpp.org.

In D2D communication when UE1 has a role of transmission, UE1 sends data and UE2 receives it. UE1 and UE2 can change their transmission and reception role. The transmission from UE1 can be received by one or more UEs like UE2. FIGS. 4 and 5 illustrate the protocol layers, service points and multiplexing in downlink and uplink respectively for the transmission on different channel types.

It was agreed in 3GPP RAN1 as a working assumption that a synchronization source is any node that transmits a D2D synchronization signal (D2DSS). It can be an eNB or a normal UE. When the synchronization source is eNB, the D2DSS is the same as Rel-8 PSS and SSS. D2D UE uses the synchronization signal(s) to determine the timing for transmitting D2D signal. It was also agreed as a working assumption that before starting to transmit D2DSS, a D2D UE scans for synchronization sources. If a synchronization source is detected, the UE may synchronize its receiver to it before it may transmit D2DSS. If no synchronization source is detected, a UE may nevertheless transmit D2DSS. A UE may (re)select the D2D Synchronization Source it uses as the timing reference for its transmissions of D2DSS if the UE detects a change in the D2D Synchronization Source(s), based on following metrics:

Synchronization source type. eNB or UE
Received D2DSS quality
Number of hops from eNB.

SUMMARY OF THE INVENTION

The aim of the present invention is to provide an efficient method and apparatus for performing selection of the synchronization source.

This is achieved by the features of the independent claims.

Further advantageous embodiments of the invention are the subject matter of the dependent claims.

In accordance with an embodiment of the invention, a synchronization receiving device is provided, comprising: a synchronization reception unit for receiving predetermined wireless synchronization signals from synchronization sources including a synchronization source which derives its timing from a network node and a synchronization generating wireless device; a metric acquisition unit for determining a selection metric for each of the synchronization sources based on at least two of: quality of the received synchronization signal; whether the synchronization source is deriving its timing from a network node or is generating the timing; and the number of hops to a network node, a synchronization source selection unit for selecting the synchronization source according to the metric determined by the metric acquisition unit, and a timing unit for determining or adjusting the timing for transmission or reception of data according to the synchronization signal of the synchronization source selected by the synchronization source selection unit.

In accordance with another embodiment of the invention, a method for selecting a synchronization source is provided, which comprises the steps of: receiving predetermined wireless synchronization signals from synchronization sources including a synchronization source which derives its synchronization signal from a network node and a synchronization generating wireless device; determining a selection metric for each of the synchronization sources based on at least two of: quality of the received synchronization signal; whether the synchronization source is transmitting a network node originating or a network node independent synchronization signal; and the number of hops to a network node, selecting the synchronization source according to the metric determined, and determining or adjusting the timing for transmission or reception of data according to the synchronization signal of the synchronization source selected.

In accordance with another embodiment of the present invention, a computer program product comprising a computer-readable medium having a computer-readable program code embodied thereon is provided, the program code being adapted to carry out the present invention.

According to an embodiment of the present invention the above apparatus is embodied on an integrated circuit.

The above objectives and other objectives and features of the present invention will become more apparent from the following description and preferred embodiments, given in conjunction with the accompanying drawings in which:

FIG. 5 is a flow diagram illustrating layer 2 uplink protocol and multiplexing structure with configured carrier aggregation;

DETAILED DESCRIPTION

Figure 1:
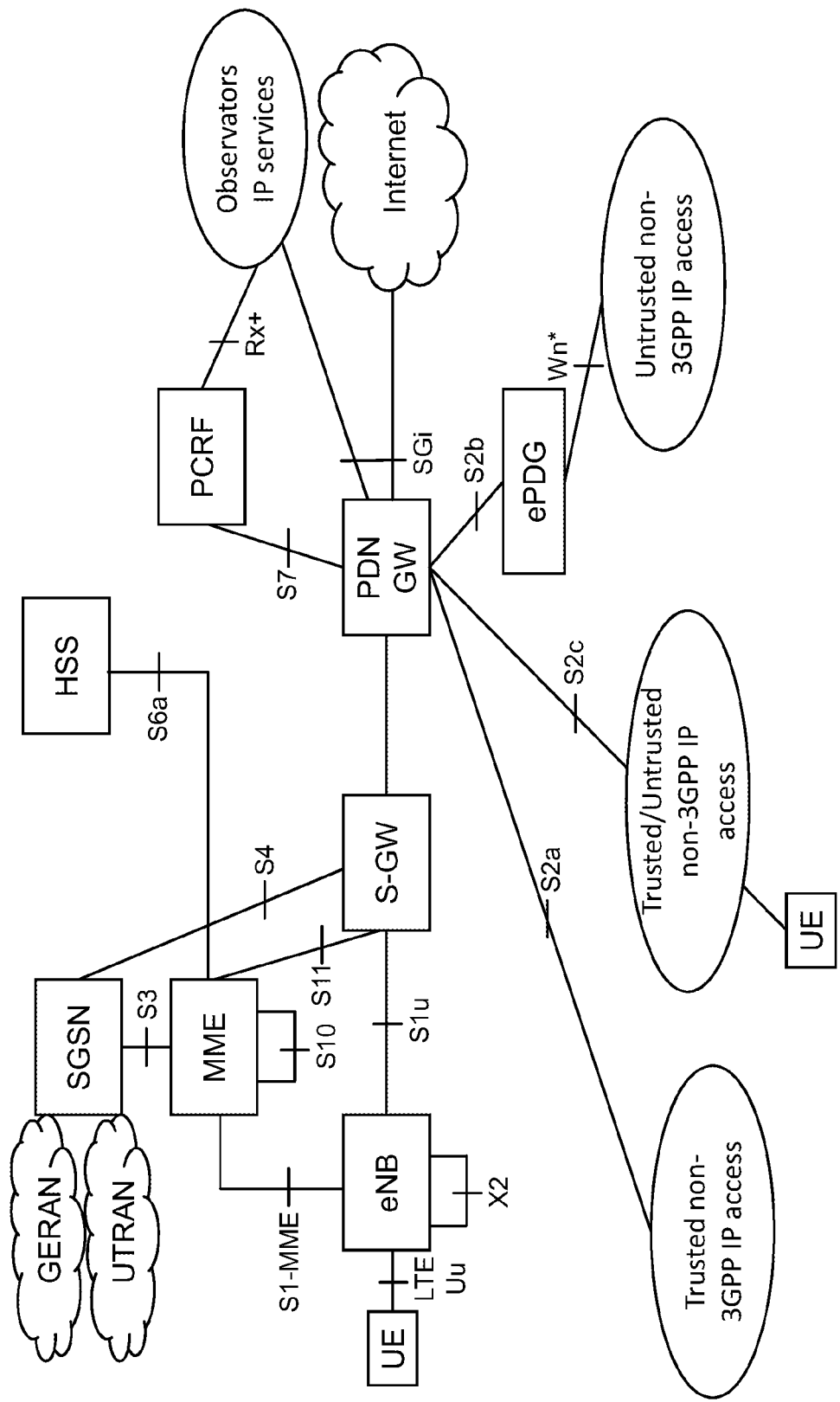
FIG. 1 is a block diagram illustrating an example of an overall LTE architecture.
Figure 2:
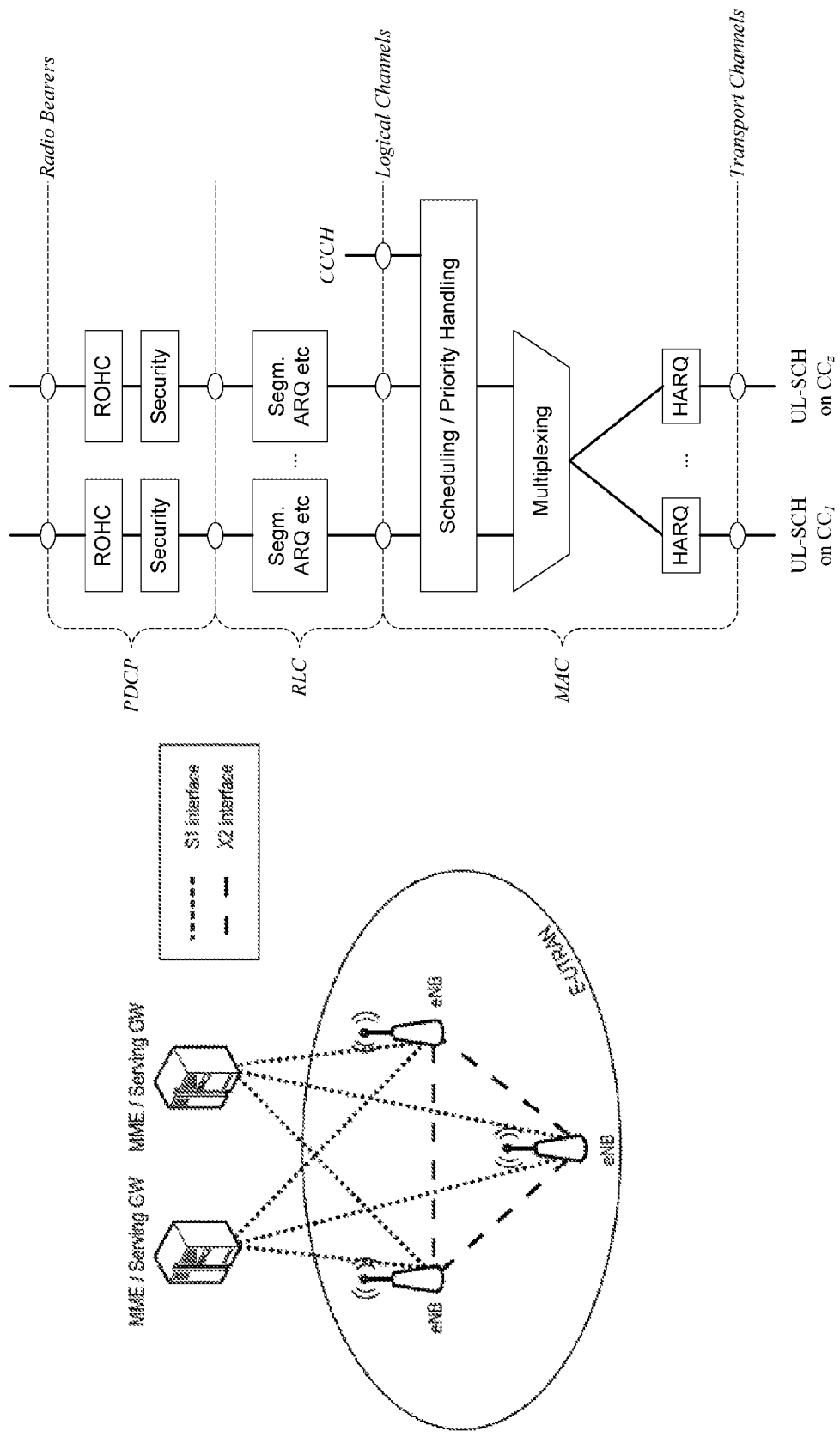
FIG. 2 is a block diagram illustrating an example of an LTE access network architecture.
Figure 3:
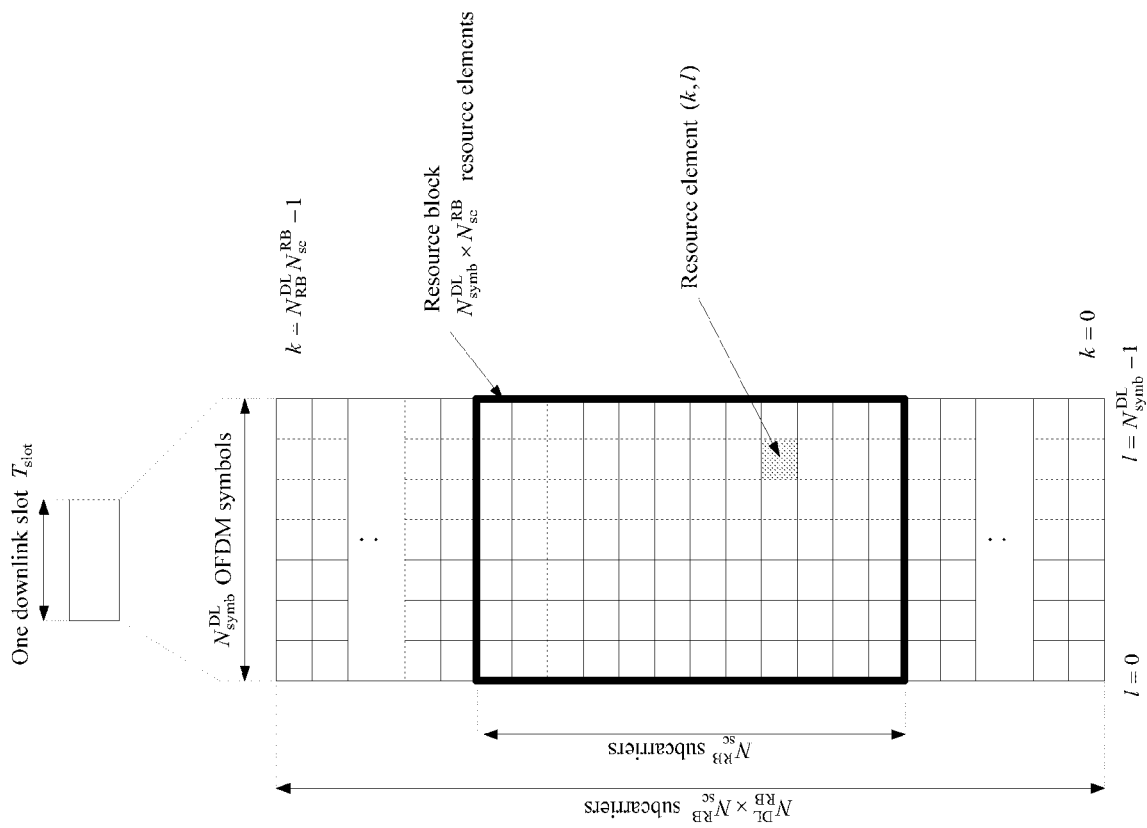
FIG. 3 is a schematic drawing illustrating an example of a grid of OFDM modulation resources in time and frequency domain.
Figure 4:
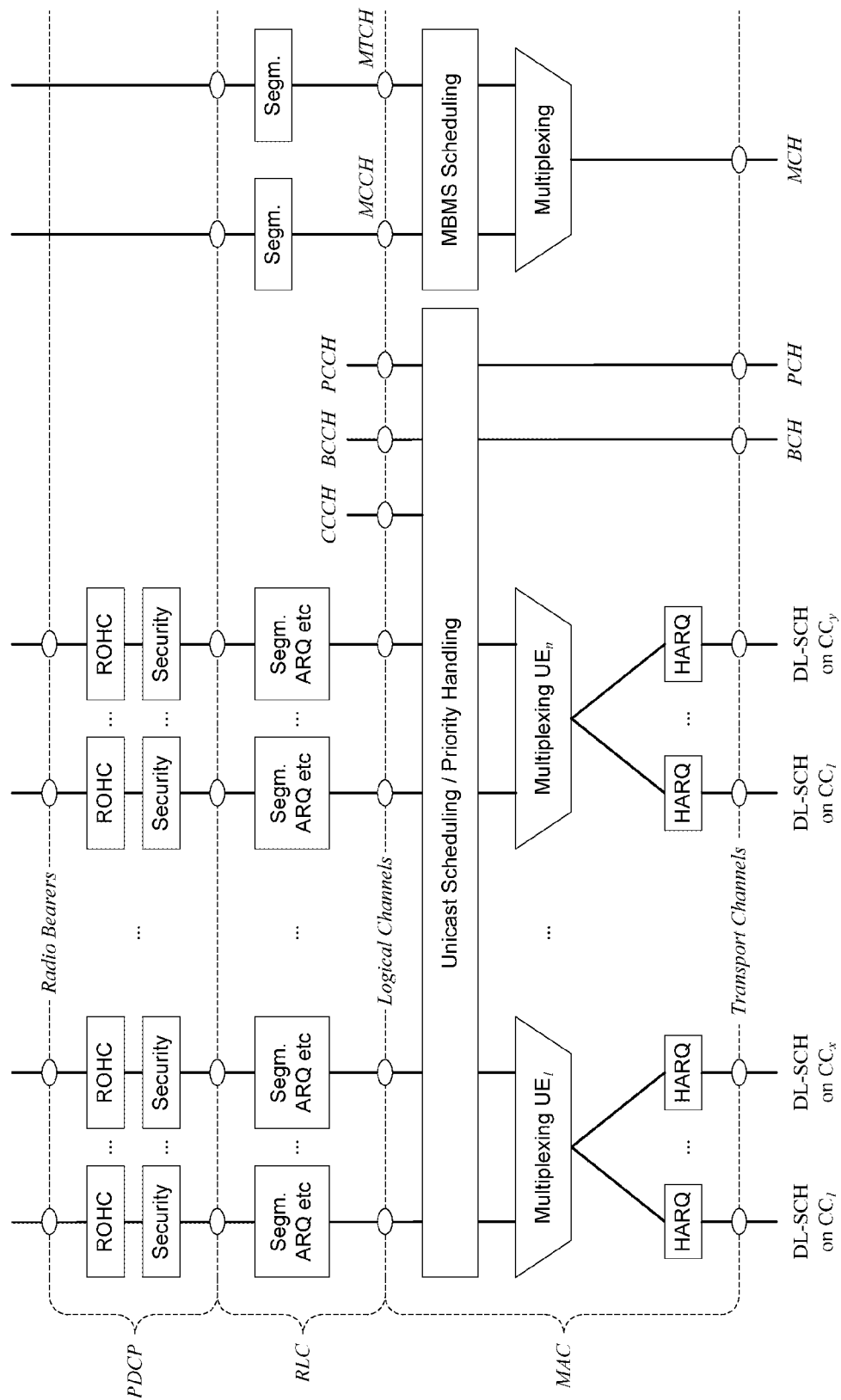
FIG. 4 is a flow diagram illustrating layer 2 downlink protocol and multiplexing structure with configured carrier aggregation.

The present invention relates to reception of synchronization signals and to a selection of the synchronization signal source in a wireless system, in which the transmitter of a synchronization signal may be a network node such as a base station as well as a wireless device which is not a network node such as a user equipment (terminal), which may be a mobile phone, a smartphone, a tablet, a notebook or another computer. Moreover, the wireless device may derive its timing from the network or independently of the network.

The term "network node" in this context is to be understood as any node connected to a cellular network. It is noted that the term "cellular network" or "cell" refer to any arrangement of a cell including macro cells, micro cells, pico cells, femto cells or any other concepts. The network node may thus be a base station such as eNodeB or a relay provided as a part of the network.

An embodiment of the present invention advantageously provides an efficient approach for selecting a synchronization source among a plurality of synchronization sources, for the purpose of device to device communication coexisting with network transmissions, i.e., in a system supporting wireless transmission between base station(s) and user equipments as well as a direct communications between the user equipments, sharing the same resources.

In the following, an embodiment is provided based on the LTE specification. However, the present invention is in no way limited to the LTE. The concepts and examples described therein are applicable to any wireless system in which a synchronization source is to be selected among synchronization sources which include one or more network nodes and one or more wireless devices, which are not network nodes such as user terminals. The wireless devices may derive their synchronization from the network, i.e., from a network node, or generate the synchronization signal independently of the timing of a network.

If a user equipment (UE) transmits a device to device (D2D) signal, the rules for determining which D2D Synchronization Source the UE uses as the timing reference for its transmissions of the D2D signal may be:
1. D2D Synchronization Sources which are eNodeBs have a higher priority than D2D Synchronization Sources which are UEs;
2. D2D Synchronization Sources which are UEs in-coverage have a higher priority than D2D Synchronization Sources which are UEs out-of-coverage.

After giving priority to D2D Synchronization Sources which are eNodeBs, followed by UEs in-coverage, a D2D Synchronization Source is selected. The in-coverage UEs are UEs which are located within the coverage of a base station, and which can thus derive their synchronization (timing) from the network. The out-of-coverage UEs are UEs, which are out of coverage of the network. If they are also out of coverage of other UEs, deriving their timing from the network timing, then such out-of-coverage UEs generate their own timing, independent of the timing of the network.

In the D2D synchronization source selection procedure, this criterion is not sufficient, since other factors, such as received D2DSS quality and number of hops from eNB, have not been taken into account. Soft criteria based on multiple factors are more reliable than criteria based only on one factor.

Figure 6:
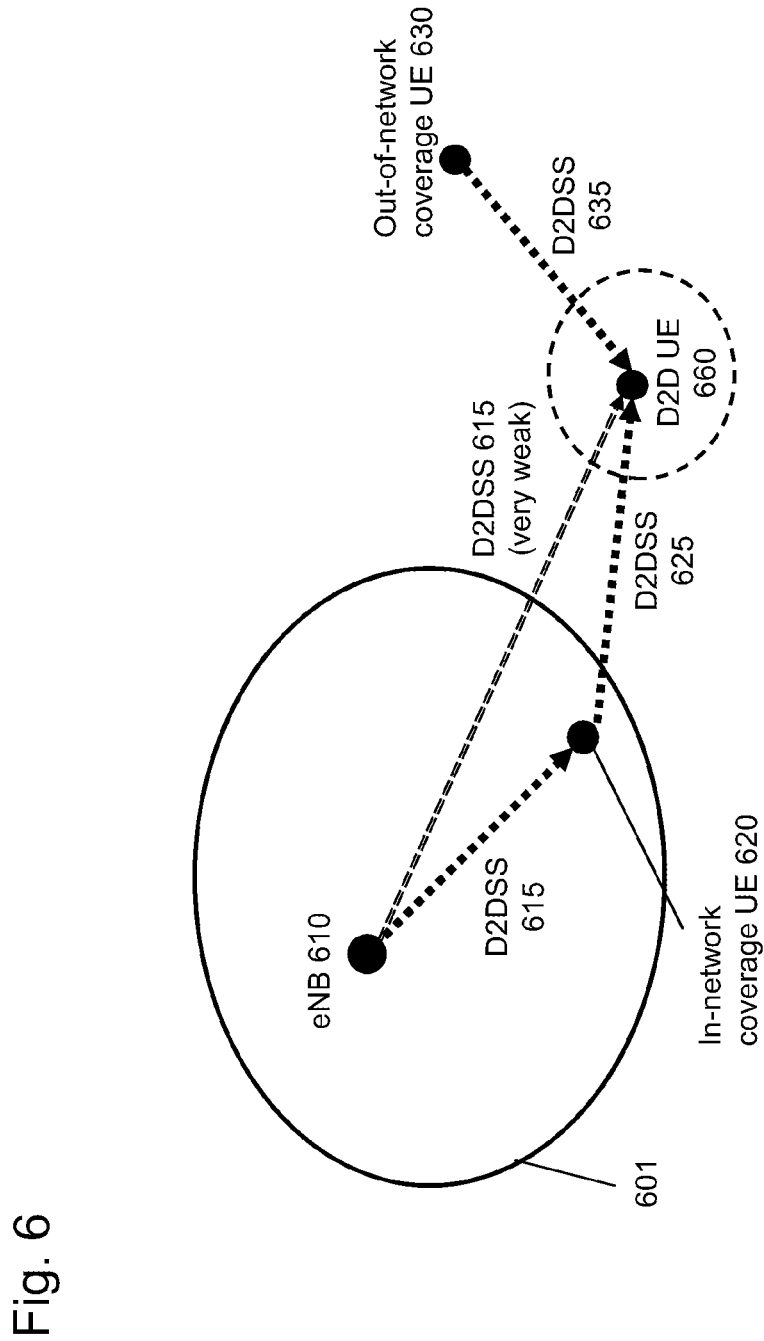
FIG. 6 is a schematic drawing illustrating different sources of the device-to-device synchronization signal.

FIG. 6 illustrates a typical scenario occurring during communications in a system supporting both network-terminal communications and direct communications between two or more terminals. A base station, eNB 610, has a coverage indicated by an ellipse 601. The eNB 610 transmits a device to device synchronization signal (D2DSS) 615, which has here the same form as the Release 8 primary synchronization signal (PSS) and the second synchronization signal (SSS). A terminal 620 is an in-network coverage UE, i.e., a UE which is located within the coverage 601 of the base station 610. The in-network coverage UE 620 receives the PSS/SSS from the eNB 610 and synchronizes to the eNB 610. The eNB 610 can request some in-network coverage UEs such as 620 to transmit the D2DSS. Accordingly, as shown by a dashed line, the in-network coverage UE 620 is configured by the eNB 610 to transmit the D2DSS, and thus transmits the D2DSS 625. The UE 620 is thus also a synchronization source which derives its synchronization (timing) from the network, in particular from the network node 610.

Moreover, FIG. 6 shows an out-of-network coverage UE 630. If an out-of-network coverage UE, i.e., a terminal which is located outside the coverage 601 of the eNB 610, does not receive any D2DSS with a reception quality exceeding a certain predetermined or predefined threshold, such UE will generate and transmit its own D2DSS. Accordingly, even in the absence of the network proximity, such UE 630 is capable of a device to device communication. The out-of-network coverage UE 630 in this example does not receive the D2DSS 615 and also not the signal 625 generated by the in-network coverage UE 620 based on the timing from the eNB 610 received, such that the reception quality of the D2DSS 615 and 625 does not exceed the predetermined reception quality threshold. Accordingly, the out-of-network coverage UE 630 generates and transmits its own D2DSS 635.

FIG. 6 further shows a D2D UE 660, i.e., a terminal which is capable of communicating directly with other terminals but also with the network. The D2D UE 660 is located out of the coverage 601 of the base station 610. The D2D UE 660 still receives the D2DSS 615 from the eNB 610, however only with a low reception quality, i.e., the received D2DSS 615 is rather weak. Apart from the D2DSS signal 615, the D2D UE 660 also receives the D2DSS 635 from the out-of-network coverage UE 630. In addition, since the in-network coverage UE 620 also transmits the D2DSS 625, the D2D UE 660 is also receiving the D2DSS 625 with the quality higher than the D2DSS 615 directly from the eNB 610. Accordingly, the D2D UE 660 receives D2DSS 615, 635 from the following three synchronization sources:

The eNB 610: the corresponding D2DSS 615 is very weak, but it is directly from the eNB, i.e., there are no hops between the D2D UE 660 and the source 610;

The in-network coverage UE 620: the corresponding D2DSS 625 is strong and originates from the network, but it involves one hop from the network represented by the eNB 610 to the D2D UE 660, the hop being the in-network coverage UE 620; and The out-of-network coverage UE 630: the corresponding D2DSS 635 is also strong, but it does not originate from the network, i.e., in this case from the eNB 610.

Based on the above situation, the question is, which synchronization source the D2D UE 660 should choose to synchronize its receiver (and/or transmitter): the eNB 610 with a very weak signal but no hops, or the in-network coverage UE 620 with a strong signal but some (one in this case) hops, or the out-of-network coverage UE 630 with a strong signal but unknown hops (signal not originating from the network).

A possible solution to this problem is to assign a D2DSS 615 and 625 derived from an eNB (and transmitted by the eNB 610 or a UE 620) always a higher priority than to a D2DSS received from a UE, which generated the D2DSS 635 independently of the network timing, such as 630. However, apart from the fact that such synchronization signal received directly or originating from the network may generally be the most accurate one, the following problems may occur:

The signal 615 received from the eNB 610 directly or the signal derived therefrom (such as signal 625) can be far weaker and thus also less reliable than the signal generated by and received from a UE(s) such as 630 and/or The signal derived from the eNB 610 can pass different number of hops from the eNB and the received signal strength can vary.

Therefore, some extended principle is beneficial to give clearer and more efficient rules on how a UE should select the synchronization source.

There has been a contribution by LGE in 3GPP RAN 1 with the number R1-140330, titled "Discussion on D2D Synchronization Procedure", which suggested the following rules: The D2DSS signal quality is used as a preliminary selection criteria. Any D2DSS that does not meet a minimum signal quality requirement will be eliminated from the further selection procedure in advance without even applying the selection rules. For those D2DSS that pass the preliminary selection, either the priority of the source type or the priority of the hop count is used. For example, UE always chooses the D2DSS originating from the eNB, no matter how many hops it has. On the other hand, if no D2DSS passes the signal quality requirement, the D2DSS with highest signal quality is chosen regardless of source type and the hop count. The problems of this approach are, for instance, that the signal quality is not considered in the selection rules, once it passes the minimum signal requirement. If two signals are both above minimum signal requirement, but one signal is much stronger than the other, the much stronger signal does not have an advantage in the selection process. It can happen that D2DSS original from eNB is much poorer than from an out-of-network coverage UE, but the UE will still choose eNB, if both D2DSS pass the preliminary requirement. Moreover, when all D2DSS are below signal requirement, only signal quality is considered. This can cause the UE to still choose out-of-network coverage UE even if the signal quality from out-of-network coverage UE is only a little bit better than from the eNB.

The target of the design here is to consider more factors in the selection of a synchronization source and to choose the most reliable source, i.e., to improve the efficiency of the synchronization signal selection. In order to achieve this, a priority function is provided, which takes into account at least two of the following factors: the original synchronization source type, received signal quality, and hop count counted from the eNB. Accordingly, the UE will then choose the synchronization source with the highest priority value as the most reliable source.

Thus, according to an embodiment of the present invention, a synchronization receiver is provided which comprises a synchronization receiving unit for receiving predetermined synchronization signals from different synchronization sources including at least source transmitting a signal originating from a network node and a synchronization generating wireless device, wherein the wireless device is not a network node but rather user equipment. The synchronization receiver further includes a metric calculation unit for determining a respective metric for each of the synchronization sources from which a synchronization signal is received. The metric is based on at least two of: quality of the received synchronization signal; source type, i.e., whether the synchronization source is a source transmitting a signal originating from a network node or a wireless device generating the synchronization signal; and the number of hops to a network node. The synchronization receiver further comprises a synchronization source selection unit for selecting the synchronization source according to the metric, and a timing unit for adjusting the timing for transmission and/or reception of data according to the synchronization signal of the synchronization source selected by the synchronization source selection unit.

The synchronization receiver as described above may advantageously form a part of a wireless communications device, such as a terminal or any user equipment. However, the synchronization receiver may also be a relay, which may be beneficial especially in case of mobile relays. It is noted that even if the embodiments here are described in the context of the LTE system, i.e., a mobile communications system, the present invention is not limited thereto. Rather it may be applied also to multicast/broadcast receivers, which can adapt their reception timing accordingly. The multicast/broadcast receivers may be also working on the basis of the LTE standard. However, the present invention is also applicable in other systems such as digital video broadcasting.

The synchronization signals are predetermined signals known at both sides, the receiver and a transmitter (source), of such signals. The synchronization signals or their properties and/or resources on which they are to be expected are typically specified in a standard. They may be predefined fixedly, or selectable (determinable) from a set of available synchronization signals, as is the case, for instance, for the PSS and SSS of the LTE as described above in connection with the technical background. A synchronization source is any entity which transmits a synchronization signal such as a base station, a relay, a UE or the like.

The selection unit selects the synchronization source based on the metric. For instance, the selection unit may be configured to select the source having the value of the metric indicating the highest reliability. This may be performed by selecting, for instance, the source of which the metric value is the highest among the metric values, if the sources are evaluated. However, depending on the design of the metric, the most reliable source may correspond not to the highest but to the lowest metric value. In such a case, the source would be selected having the minimum metric value. However, it is noted that the selection unit may generally perform the selection in any way according to the metric.

Moreover, the selection is not limited to be performed at the beginning of the desired transmission. Rather, the selection may be performed regularly in order to check whether an appropriate synchronization source is used and in order to reselect the same or another source.

The timing unit derives the timing from the synchronization signal received from the selected synchronization source. The timing may be used to determine or adjust the transmission or reception timing of data. The transmission or reception timing of data can be the same as received timing of a synchronization signal or be the received timing minus a fixed or configured offset. In the first (initial) source selection, a UE determines its timing according to the received synchronization signal. In the reselection (selection performed after the initial selection), the UE may, instead of determining, merely adjust its timing according to the new synchronization source. Here, the initial source selection may be, for instance, a selection upon switching on the UE. The timing unit may derive the timing for reception and transmission in a different manner. For instance, the timing for reception may be determined directly as the timing of the received synchronization signal, whereas for the transmission the timing may be determined by applying a timing advance, i.e., an offset with respect to the reception timing. Such offset may be determined in the same way as in LTE. The transmission timing may also be determined directly as the timing of the received synchronization signal or be determined by applying a predefined offset. However, the present invention is not limited by these examples and, in general, the timing unit may derive the timing from the synchronization signal in any way.

Advantageously, the metric acquisition unit is configured to determine the metric as a combination of the quality of the received synchronization signal and a selection bias determined based on the number of hops and/or based on a type of the synchronization source, which is either a network-originating source or a network-independent source such as wireless device generating the synchronization signal without contribution from the network.

For instance, the priority function (i.e., the metric) may be the sum of the received signal quality and the derived priority bias (selection bias). The received signal quality is measured, for instance, at the synchronization signal receiver. The measurement of the signal quality may be performed in any way, for instance on the basis of a synchronization signal. Accordingly, the synchronization source transmits in predetermined resources signals with predetermined power. The resources and the power are known to the receiver, which measures the power of the received signal, which may be directly the quality parameter. However, the quality parameter used in the metric may also be determined as a function of the measured received signal power. It may be a ratio or difference between the transmitted a received signal, indicative of the signal degradation. The measurement may also correspond to the CRS (cell reference signal) measurement as performed in the LTE (3GPP TS 36.331, v 12.1.0, "Radio Resource Control (RRC); Protocol specification").

Then, the selection bias (offset of the received signal quality) is determined based on the number of hops and the type of source. The selection bias values corresponding to some combination of the source type and the hop count values may be defined in the specification. One way of definition is through a table. In particular, the metric acquisition unit may be configured to determine the selection bias according to an association between predetermined selection bias values and the respective numbers of hops. Such an association may be a table, which could be a look-up table stored at the receiver and associating a particular combination of a number of hops and type of the source with a certain value of the bias. Alternatively, the bias may be determined only on the basis of one of the number of hops and source type. In such case, the look-up table would associate only the number of hops with a certain bias value. Alternatively, a bias value may only depend on the source type. In such an example, the table would associate the source type (network-originating source, network-independent source) with a particular respective value of the selection bias.

It is noted that the above offset may be positive offset (bonus). For instance, if the source is a network node, such as base station or a UE deriving its synchronization signal from the network, the offset is a positive predetermined value. It the source is a network-independent UE, the value of the offset is smaller than the value of the offset for the network node. It may also be equal to zero. The source type may also distinguish between the source being a network node and the source being a wireless device of which the synchronization signal is derived from the network synchronization signal (i.e., is originating from the network).

However, the present invention is not limited thereto and the offset may alternatively be a negative offset (penalty). Accordingly, different penalty values are associated with respective different combinations of the type of source and the number of hops. Alternatively, penalty (or bonus) may be provided separately for the source type and separately for the number of hops. Still alternatively, the penalty may be provided only for the number of hops or only for the source type.

Similarly, penalty or bonus may be based on the number of hops. The number of hops may be:
 counted down to the synchronization source (starting from a predetermined maximum number of hops for that synchronization source) or
 counted up from the synchronization source (e.g., starting from 0 at the synchronization source).

In other words, the hop count from eNB can be represented as an increasing hop-count or a decreasing hop count with respect to the eNB.

For instance, counting up from the eNB means that if the eNB 610 is the source of the synchronization signal, there are 0 hops towards the synchronization receiving UE 660 (as in case of signal 615). If the in-network coverage UE 620 is the source of the synchronization signal, there is one hop from the eNB 610 to the receiving UE 660, the one hop being represented by the in-network coverage UE 620 (as in case of signal 620). There may be further hops between the eNB 610 and the receiving UE 660. In all these cases, the original source of the synchronization signal is the eNB 610, and the hops such as 620 are merely transmitting the same synchronization signal, or the synchronization signal reproduced on the basis of the original synchronization signal received from the eNB 610. The counting up of the hops from the original source (in this case the network source eNB 610) results in a positive number of hops or zero.

However, the hops may be alternatively counted down from the synchronization receiver to the synchronization source. In particular, if the synchronization is received directly from the eNB 610 by the UE 660 (signal 615), then the number of hops from the eNB to the receiving UE may be set to a maximum number of hops NHmax supported for that network node (eNB 660). Different network nodes can have different maximum numbers of hops. For example, macro eNB has higher number of hops than micro eNB, since macro eNB has higher accuracy of timing and frequency. Down-counting has the benefit that the UE does not need to know the maximum number of hops if the maximum number of hops is configurable for the eNB. If the synchronization receiving device 660 receives the synchronization signal 625 from the UE 620, then the hop count, counted down from the eNB 610, is NHmax-1 at the receiving UE 660. As in the above example, the number of hops may be even lower, such as NHmax-2, NHmax-3, 0, corresponding to more than one devices (located between the original source 610 and the receiving UE 660) receiving the synchronization signal originating from a network node and transmitting it further (or, transmitting the synchronization signal reconstructed from the received synchronization signal). In other words, when counting-down the hops, one starts from a maximum number of hops predetermined for the given eNB 610. In particular, the maximum number of hops may be set/determined for different eNBs as a different value. The predetermined maximum number of hops can be set for an eNB by the network. The UE obtains the information concerning the maximum number of hops via signaling from the eNB. This can be performed either via D2D control channel, broadcast signaling or within the synchronization signal.

If the above-described increasing hop-count is used, i.e., the hop-count starting with 0 at the network node, then the priority bias function is advantageously designed such that the bias value decreases when the hop count increases. If on the other hand the decreasing hop-count is used, i.e., the hop-count starting with NHmax at the network node, the priority bias function is advantageously designed such that the bias value increases when the hop count increases. Here, the term "priority bias function" refers to a function or rule for associating the values of the bias with the values of the hop-count (count of hops).

The above-described examples of association between the selection offset (bias) and the number of hops and/or source type are not to limit the present invention. According to another example, the penalty and bonus may also be combined. For instance, a bonus may be provided for network node as source whereas, no bonus is provided for other sources, and a penalty may be provided for the positive number of hops, or vice versa.

As described above, the relation between the bonus, source type and hop-count can be defined by means of a look-up table. The table may be specified in a standard, i.e., may be predefined. Alternatively, the penalty or bonus may be calculated on the basis of a certain function. For instance, the penalty may be proportional to the number of hops (up-counted), e.g., the value of the penalty may be twice the number of hops. Alternatively, the function may be inverse proportional to the number of hops down-counted. However, this is only an example, and the function may have a form other than simple multiplication or a multiplier other than 2. The particular selection of the function (as well as the table values) depends on the desired influence of the number of hops and/or the type of source on the metric.

In summary, the bias is advantageously determined as a value (bonus or penalty) which is higher for the network nodes being the source of the synchronization signal than for the wireless devices being the source of the signal. This enables preferring the network nodes as synchronization source before the wireless devices which are independent of network nodes, i.e., the synchronization signal of which is not derived from the network. Such a preference may be beneficial since it is generally expected that the D2D communication and the network-device communications shall use the same bandwidth and time. Thus, a timing coordinated with the timing of the network may help reducing the interference and improve the reception quality. Moreover, some coordination between network-device transmissions and D2D transmissions may be performed by the network.

Alternatively or in addition, the bias may be determined as a value (bonus or penalty) which decreases with increasing number of hops between the network node and the synchronization receiving device, where the number of hops is a positive integer, or as value which increases with increasing number of hops between the network node and the synchronization receiving device, where the number of hops is also a positive integer. These two possibilities aim at increasing the value of the metric if the synchronization receiving device is close to the network source, and decreasing the value of the metric if it is far from the network source. The proximity here is expressed by the number of nodes (wireless devices) between the network node being the source of the synchronization signal and the synchronization receiving node.

Figure 7:
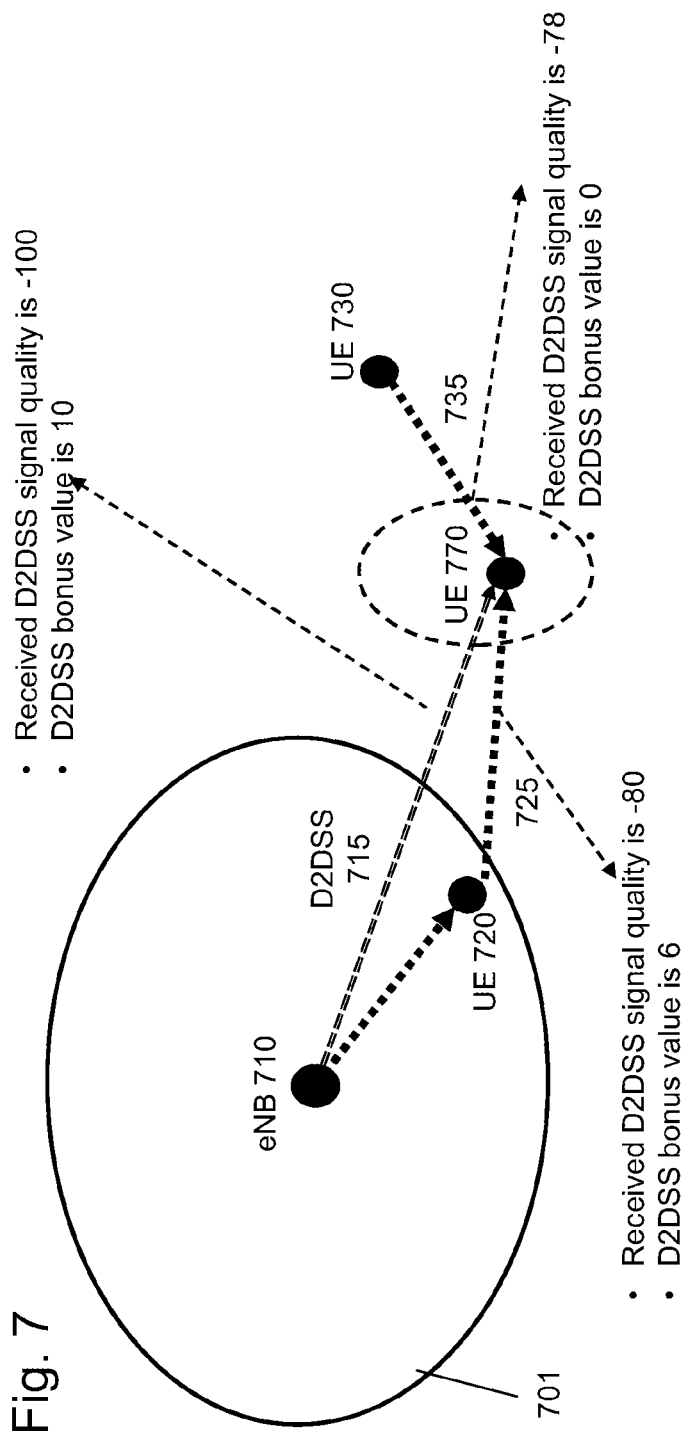
FIG. 7 is a schematic drawing illustrating an example scenario for selecting a synchronization source based on a metric based on signal quality and a table with selection bias values.

FIG. 7 illustrates an embodiment of the present invention, in which eNB 710 has the coverage indicated by the ellipse 701. The D2D UE 770 receives a synchronization signal 715 from the eNB 710 with the received signal quality of −100 dBm. The D2D UE 770 further receives a synchronization signal 725 originating from the eNB 710 over the hop formed by the in-network coverage UE 720 with the received signal quality of −80 dBm. Finally, the D2D UE 770 receives a synchronization signal 735 from the out-of-network coverage UE 730 with the received signal quality of −78 dBm. Thus, when selecting the synchronization source only according to the received signal quality, then the out-of-network coverage UE 730 would be selected since it has the highest received signal quality, followed by the UE 720 and finally by the eNB 710. In this embodiment, however, the selection of the synchronization is performed differently. The table on the bottom of FIG. 7 shows an association between the bonus value ($3^{rd}$ column) and a combination of the source type ($1^{st}$ column) and the hop count ($2^{nd}$ column). The original source type may be either the eNB 710 or a wireless device, which does not derive the synchronization signal from the network node, i.e., here, the out-of-network coverage UE 730. The number of hops distinguished in the present example is 0, 1, or more than 1. The selection bias is in this case a bonus which may take values 10, 6, 3 or 0 depending on the source type and the number of hops. In particular, if the source is the wireless device 730, then irrespectively of the number of nodes, no bonus (bonus with value zero) is added to the received signal quality (power). It is noted that in these examples, the wireless device 730 generates the synchronization signal. However, in general, the synchronization signal could also be generated by some other wireless device and, thus, the number of hops may also be distinguished for this source type.

For the sources in FIG. 7, thus, the respective metrics are calculated as follows:

eNB 710: received signal power of −100 dBm is added to the bonus value 10 (0 hops, source eNB in the first table row), resulting in the metric value −90.

UE 720: received signal power of −80 dBm is added to the bonus value 6 (1 hop, source eNB in the second table row), resulting in the metric value −74.

UE 730: received signal power of −78 dBm is added to the bonus value 0 (any number of hops, source UE in the last table row), resulting in the metric value −78.

Accordingly, the source with the highest reception quality of −74 is the UE 720, followed by the UE 730 and the eNB 710. Thus, the D2D UE 770 chooses the in-network coverage UE 720 as a synchronization source since it has the highest value of the metric. In this example, the up-counting is used for the hop-count.

In order to be able to derive the metric, the synchronization receiving UE advantageously obtains the information on the source type and the number of hops from the hop transmitting the synchronization signal. This can be performed by decoding a D2D synchronization signal or a D2D synchronization control channel, if the synchronization source is a UE (with network-originated or network-independent synchronization signal). If the source is eNB, the information is already carried by the cell-ID in the synchronization signal—based thereon it is clear that the source is an eNB and thus the number of hops is 0 (or NHmax, depending on the hop-counting strategy applied). Instead of determining the selection bias value by using a table based on the source type and hop count, the bias value can be indicated directly via a D2D synchronization signal or via a control channel such as the D2D control channel. In other words, the selection bias is determined by receiving it within signaling information transmitted from the respective synchronization source. In this way, the determination of the bias value is more flexible, and no calculation or looking-up in the table is necessary at the receiver. For example, UE 720 in FIG. 7 will directly indicate the bonus value of 6 through a D2D synchronization signal or a control channel such as D2D control channel.

The assignment table as described above can be configured for the synchronization receiving device by means of control signaling. For instance, the table of FIG. 7 may be transmitted to the receiving device (UE) via RRC signaling. Alternatively, a default table may be applicable and, in addition, there may be a possibility of transmitting a modified table after RRC connection is established to the network. Another alternative is that multiple tables are predefined in the specification. The selection of table can be based on eNB type or be configured by higher layer signaling.

In accordance with another embodiment of the invention, the metric acquisition unit is configured to determine the metric as a linear combination of the quality of the received synchronization signal; a number representing whether the synchronization source is a network node or a wireless device; and the number of hops to a network node.

In particular, the function may be given by $$M=a*T+b*H+c*Q$$

wherein T is the original synchronization source type, for instance T=1 if the original source is eNB and T=0 otherwise; H is the count of the hops, i.e., the number of hops between the original source of synchronization and the synchronization transmitting hop which can be also considered to indicate the number of hops between the original source and the synchronization receiver; Q is the signal quality, which may be given, for instance by the received signal power in dBm; and a, b, c are weights for weighting the respective above three parameters T, H, and Q. The weights a, b, and c may be in general real numbers. However, in order to simplify the implementation, the weights may also be integer numbers. It is noted that the signal quality is not necessarily directly the measured received power. Alternatively, the reception quality may be represented by a predefined number of levels which are determined on the basis of the measured signal power. For instance, different categories may be defined, e.g., "excellent", "good", "fair", "bad", "very bad", depending on the dBm value. These categories may then be represented by an integer, which is easier for calculating the above equation. For instance, excellent quality may be assigned number 5, good quality number 4, fair quality number 3, bad quality number 2 and very bad quality number 1.

For instance, since the D2DSS derived from the eNB has a higher priority than the D2DSS derived from another source, weighting factor a is advantageously a positive integer a>0. If the hop count is counted up from the eNB, then the weighting factor b is advantageously a negative number b<0, whereas if the hop-count is counted down, b>0. The higher is the received signal quality, the higher should be the metric value. Thus, c>0 if the received quality is expressed in dBm as exemplified also above, since the received quality in such case is a negative number, which means the higher the quality value is, the better. If c<0, e.g., −1, then −100 dBm is better than −90 dBm. The metric M can be <0, if the received quality is a negative number. However, these are only examples. As is clear to those skilled in the art, the metric is to be designed in order to represent source reliability. The particular design, such as usage of up/down counting of hops or positive/negative values of the parameters T, H, Q and, correspondingly, the weighting factors a, b, c, may be implemented in any way.

The weighting factors and thus the metric may be configured for each UE (receiving device). For the out-of-network coverage UEs, the weights a, b, and c may be preconfigured through OAM or forwarded by the in-network coverage UEs through D2D control channel.

For the in-network coverage UEs, the weighting factors a, b, and c can be pre-configured or configured by eNB. The configuration per eNB is advantageous and may be performed, for instance, by RRC signaling or other control signaling.

The configurability of the metric has the advantage, that each UE may be configured differently. If the UE has data forwarded from an eNB, it is advantageous that such UE is synchronized to the eNB. Then weighting factor a may be configured larger for this UE than for other UEs. If a UE has a poor reception capability (capability of detecting/decoding signals with low quality), it is advantageous to synchronize such UE with a D2DSS with highest signal quality. Then, weighting factor c may be configured larger for such UE than for other UEs not in this scenario.

In summary, the linear combination is advantageously defined as M=a*T+b*H+c*Q, with T being the source of synchronization, H being the number of hops and Q being the received signal quality; and a, b, and c being weighting factors. Then the metric acquisition unit is configured to determine the weighting factors a, b, or c by receiving them within signaling information transmitted from the network node.

In accordance with another embodiment of the invention, the synchronization source selection unit is further configured to perform a preliminary step for eliminating unqualified D2DSS. In particular, the preliminary step may eliminate from a set of sources to be considered for the selection. Only for the D2DSS which pass the preliminary selection, the metric would be determined based on signal quality and bias or based on the linear metric as described above and based on the metric, the synchronization source would be selected. This means that the excluded sources are excluded in the preliminary elimination step from being further considered as synchronization sources.

According to an embodiment of the present invention relating to the synchronization receiving apparatus, in the synchronization receiving apparatus, the synchronization source selection unit is configured to perform a pre-selection of synchronization sources by excluding from a set of candidate synchronization sources with the number of hops to the network node exceeding a predetermined hop threshold. For instance, the predetermined threshold may be equal to 3, which means that any hop with hop count larger than 3 (in case of counting up the hops) would be excluded from further selection. However, this is only an example and the threshold may also take another value such as 1, 2 or 4, or larger.

Alternatively, or in addition to pre-selection based on number of hops, a pre-selection of synchronization sources may be performed by excluding from the set of candidate synchronization sources the sources with the signal quality not exceeding a predetermined quality threshold. For instance, the predetermined threshold may be equal to −100 dBm. Thus, any hop (source) of which the synchronization signal is received with power less than −100 dBm is excluded from further selection. However, the value of −100 dBm is only an example and the threshold may take another value such as −110 dBm or −105 dBm or any other value. Moreover, it may be beneficial to set the threshold to different values depending on the type of the original source. In particular, the quality threshold may be higher for the non-network source such as the out-of-network coverage UE 730, meaning that the signal from such a UE needs to have a higher quality to pass the pre-selection than the sources which determine their signal based on the synchronization signal from the network (an eNB 710 or the in-network coverage UE 720).

In this embodiment, the metric acquisition unit is then configured to determine the metric only for those synchronization sources remaining in the set of candidate synchronization sources after the pre-selection performed by the synchronization source selection unit. The term "set of candidate synchronization sources" here refers to the sources of which the synchronization signal is received by the synchronization receiving device.

One of the advantages of the pre-selection is that the D2DSS with low quality is not selected. Thus, selection of unreliable synchronization sources may be avoided, even without determining the metric for them. Thus, the selection may be simplified in this way.

The above-described embodiments concerning the way in which the metric acquisition and selection of the synchronization source is to be performed may be further improved by controlling the reselection of the source with a hysteresis. In particular, the synchronization receiving device receives the synchronization signal from different synchronization sources. It may regularly perform the re-selection of the synchronization source by determining the metrics for the sources received and by selecting the most reliable source accordingly. If the reception signal quality varies considerably, such regular re-selection could lead to frequent changing of the synchronization source. In order to avoid such a ping-pong effect, hysteresis can be advantageously added. It means that when a UE chooses a synchronization source, it will keep that source for a certain period of time, so that UE will not change synchronization source frequently. It helps for the stability of the synchronization source. The hysteresis will decrease in time, so that best synchronization source will be selected.

The synchronization receiving apparatus may further comprise a reselection timer, and a selection control unit for controlling the metric acquisition unit to determine the metric and the synchronization source selection unit to select the synchronization source in accordance with the reselection timer. For instance, the terminal may every 10 seconds evaluate the sources from which it receives the synchronization signal. The evaluation includes the above-described determination or calculation of a metric and the selection of the best source, i.e., the source with the highest value of the metric, or, in general, with the value of the metric indicating the best source. This enables the synchronization signal receiver (such as a terminal, or more generally, a user equipment) to regularly adapt the synchronization source to the possibly changed transmission environment. It is noted that the above example of 10 seconds for the reselection period is only exemplary, and the reselection period can be set to a different value, for instance to 1, 2, 5 or 15 seconds, or any other time period. The value of the reselection timer may be fixed or it may also by configurable by higher layer protocol by the network (node) such as eNB. Configurability of the timer provides an advantage of adaption of the reselection operation to the transmission environment of the UE. If the UE is a mobile UE, the channel quality variations may be more frequent, which makes it beneficial to configure a shorter reselection period. On the other hand, if the UE does not (currently) move and the environment is not changing substantially, then it may be beneficial to configure the reselection period longer (increase the reselection period).

The synchronization receiving device further beneficially comprises a hysteresis timer which starts upon selecting a new synchronization source and expires after a predetermined hysteresis period, wherein the reselection timer is set to a predetermined reselection period. The reselection period may be received by the synchronization receiving device within control signaling from the network, e.g., from the network node such as a base station (eNB). The selection control unit then instructs the metric acquisition unit to determine the metric, and instructs the synchronization source selection unit to select the synchronization source according to the metric upon expiry of the reselection timer, if the hysteresis timer expired, and not to select the synchronization source according to the metric upon expiry of the reselection timer if the hysteresis timer did not expire. Thus a hysteresis timer helps to avoid frequent change of the synchronization source.

The predetermined hysteresis period may advantageously decrease with time. In particular, the hysteresis period may be decreased with the increasing number of reselection timer expiries.

Reselection can also be triggered when the received signal quality of current synchronization source drops below a certain threshold for a certain period of time. It is advantageous to avoid sudden disappearance of the synchronization source or the dramatic deterioration of signal quality from the synchronization source.

The present invention as described in the above embodiments provides the advantage of differentiating between the type and distance of the sources, and not only based on the reception quality. Accordingly, the UE will choose the D2DSS with much higher signal quality. The priority of the eNB and the hop-count may be considered as an offset to the signal quality. If the signal quality of the D2DSS from the out-of-network coverage UE such as 630 is not much better than that of the D2DSS from the eNB 610, the UE will select eNB.

Figure 8:
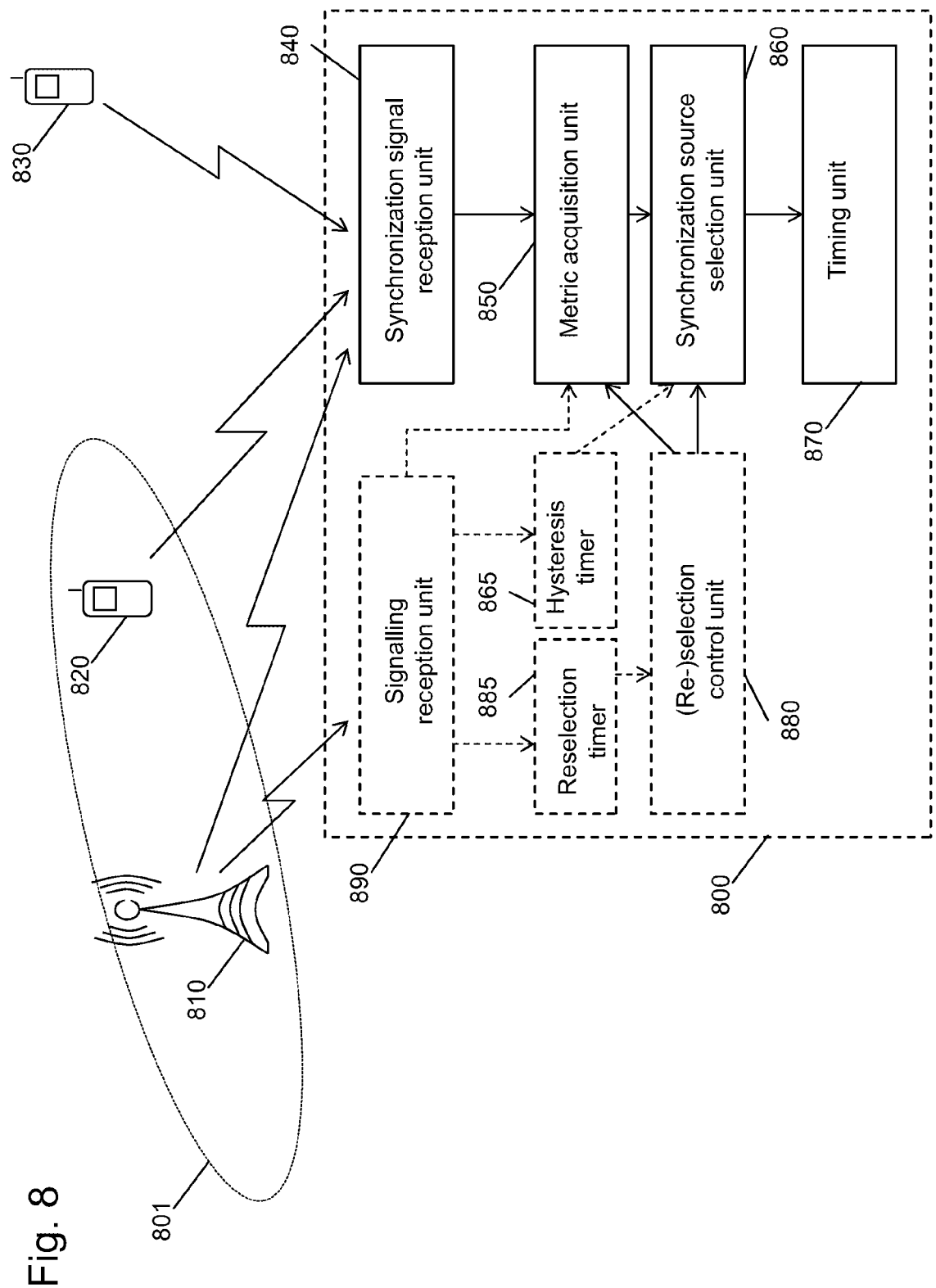
FIG. 8 is a block diagram illustrating an apparatus in accordance with an embodiment of the invention.

FIG. 8 illustrates an apparatus 800 for receiving of a synchronization signal according to an embodiment of the present invention. The apparatus 800 is a wireless device such as a user equipment. This wireless device receives various signals from different sources with different respective strength. In particular, the device may receive signals from a network node 810 such as an eNB, or from another wireless user device 820 which is located within the coverage 810 of the eNB 810, or from a user equipment 830 which is located out of the coverage 801 of the network, and in particular of the eNB 810. The apparatus comprises the synchronization signal reception unit 840, the metric acquisition unit 850, the synchronization source selection unit 860 and the timing unit 870, which are configured as described in the above embodiments. In particular, the synchronization signal reception unit 840 is adapted to receive the synchronization signal from various D2D synchronization sources. It may further identify the source based on the synchronization signal received, or at least the source type. However, this information may also be conveyed later via signaling. The metric acquisition unit 850 is configured to determine or calculate the metric, based on which the synchronization source selection unit 860 selects the synchronization source. After the source selection, the apparatus 800 determines (initially) or adjusts (after initial determination was done) its timing. In particular, it may take the received synchronization as timing for the purpose of reception or may add an offset thereto. Then, the transmission timing is derived, which may be performed based on the derived reception timing.

The apparatus 800 may further include a re-selection control unit 880 which controls the times in which the apparatus performs the re-selection. Accordingly, the re-selection unit 880 controls the metric acquisition unit 850 and the selection unit 860 to perform their functions, namely the metric calculation and the source selection at certain time instances. These time instances are advantageously derived from a reselection timer 885 also forming part of the apparatus 800. The reselection timer 885 may be configurable by means of a signaling received from the network. The reception of signaling from the network may be performed by the signaling reception unit 890. It is noted that in this block diagram, the signaling reception unit 890 and the synchronization signal reception unit 840 are drawn separately. This is because they are functional blocks. In general, the apparatus 800 would have a common reception front formed by one or more antennas, amplifiers, demodulators and decoders (possibly applicable for the signaling reception). Then the signaling and the synchronization would be used for different purposes, as shown in FIG. 8 by the separated blocks 840 and 890.

Figure 9:
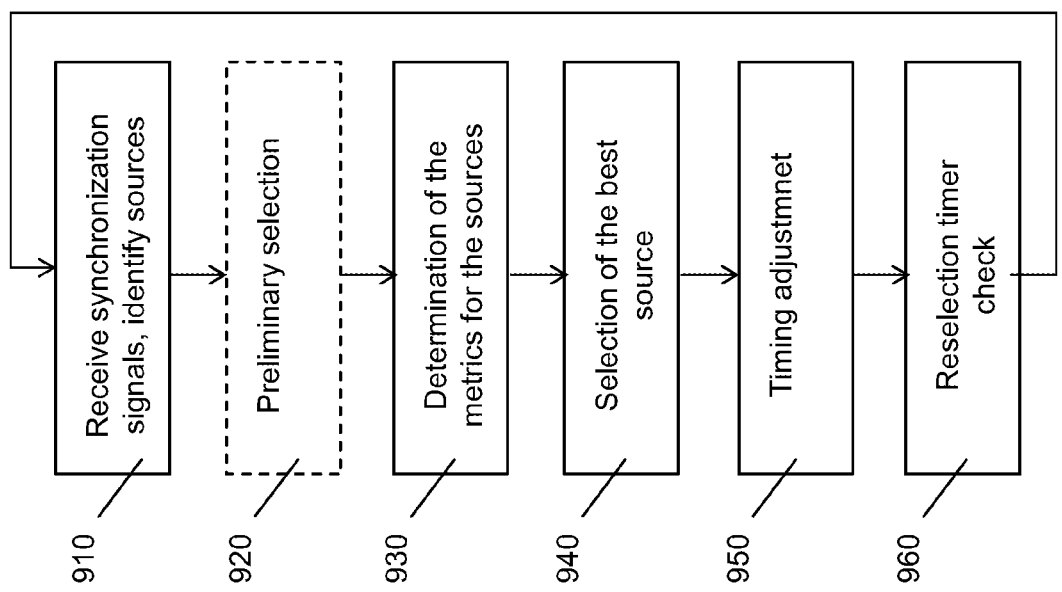
FIG. 9 is a flow chart illustrating a method in accordance with an embodiment of the invention.

The signaling reception unit may be also configured to receive signaling with settings for metric determination. For instance, the settings for the weighting coefficients a, b, c and/or for the selection bias offset and/or the bonus or penalty value may be received and provided to the metric acquisition unit 850. Moreover, a hysteresis timer 865 may be part of the apparatus and may be used by the reselection control unit 880 for controlling the synchronization source unit 860 to change or not to change the synchronization source, if the selection unit 860 based on the metrics determined in 850 would select a new synchronization source, i.e., a synchronization source other than the currently applied synchronization source. The hysteresis timer 865 may also be configured by the signaling received from the network by the signaling reception unit 890. FIG. 9 illustrates a method for selecting a synchronization source in a system as described above. In particular, such synchronization receiving method comprises the steps of: receiving 910 predetermined wireless synchronization signals from synchronization sources including a synchronization source which derives its synchronization signal from a network node and a synchronization generating wireless device. The received synchronization signals may already carry some information such as type of the source or number of hops. However, this information may also be conveyed in another way. Then the method comprises a step of determining 930 a selection metric for each of the synchronization sources based on at least two of: the quality of the received synchronization signal; source type (whether the synchronization source is transmitting a network node originating or a network node independent synchronization signal); and the number of hops to a network node. In the next step 940 of selecting the synchronization source according to the metric determined, the source is selected, which is then used for the step 950 of determining or adjusting the timing for transmission or reception of data according to the synchronization signal of the synchronization source selected.

The metric is advantageously determined as a combination of: the quality of the received synchronization signal and a selection bias determined based on the number of hops and/or based on a type of the synchronization source, which is either a synchronization source which derives its synchronization signal from a network node or a network-independent wireless device. The selection bias may be determined according to an association between predetermined selection bias values and the respective numbers of hops such as a look-up table. The selection bias may be, in particular, determined as one of: a value which is higher for the network nodes being the source of the synchronization signal than for the wireless devices being the source of the signal; a value which decreases with increasing number of hops between the network node and the synchronization receiving device, when the number of hops is counted increasingly starting from the network node; or a value which increases with increasing number of hops between the network node and the synchronization receiving device, when the number of hops is counted decreasingly starting from the network node with a predetermined maximum of hops.

Alternatively, the selection bias may be determined by receiving it within signaling information transmitted from the respective synchronization source. The present invention is not limited to determining the metric as described above and in general, the metric may also be determined as a linear combination of the quality of the received synchronization signal; a number representing whether the synchronization source is a network node or a wireless device; and the number of hops to a network node. Such linear combination is advantageously defined as $M=a*T+b*H+c*Q$, with T being the source of synchronization, H being the number of hops and Q being the received signal quality; and a, b, and c being weighting factors. At least one of the weighting factors a, b, or c may be determined by receiving them within signaling information transmitted from the network node.

The method may further comprise a step 920 of pre-selecting synchronization sources by excluding from a set of candidate synchronization sources: sources with the number of hops to the network node exceeding a predetermined hop threshold, and/or sources with the signal quality not exceeding a predetermined quality threshold. Then, the metric is determined only for the synchronization sources in the set of candidate synchronization sources after the pre-selection performed by the synchronization source selection unit.

The synchronization method may further contain a step of running (maintaining) a reselection timer, and controlling 960 the determining of the metric and the selecting of the synchronization source in accordance with the reselection timer.

The method may also further comprise maintaining a hysteresis timer which starts upon selecting a new synchronization source and expires after a predetermined hysteresis period, wherein the reselection timer is set to a predetermined time period. Then the method advantageously includes a step of instructing to determine the metric and to select the synchronization source according to the metric upon expiry of the reselection timer if the hysteresis timer expired, and not to select the synchronization source according to the metric upon expiry of the reselection timer if the hysteresis timer did not expire.

The explanations given in the Technical Background section above are intended to better understand the specific exemplary embodiments described herein and should not be understood as limiting the invention to the described specific implementations of processes and functions in the mobile communication network such as a network compliant with the 3GPP standards.

Nevertheless, the improvements proposed herein may be readily applied in the architectures/systems described in the Technological Background section and may in some embodiments of the invention also make use of standard and improved procedures of these architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above-described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Summarizing, the present invention relates to selection of a synchronization source among various synchronization sources which include sources determining the synchronization signal from the network such as base stations (network nodes) or user equipments which receive the synchronization signal possibly over other hops from the base station, and which further includes sources which do not determine their synchronization signal from the network. The selection of the synchronization source is performed by choosing the source with the most reliable synchronization signal based on a metric calculated for each of the sources considered. In particular, the metric is based on the type of the source, number of hops between the network and the source and/or received signal quality. After selecting the source, the timing of the device is adapted accordingly.

The invention claimed is:

1. A user equipment comprising:
   a receiver, which, in operation, receives a synchronization signal from a synchronization source; and
   circuitry, which, in operation,
   measures a quality of the received synchronization signal;
   determines the synchronization source as a synchronization source candidate when the measured quality exceeds a defined threshold;
   periodically selects a synchronization reference User Equipment (UE) from among the synchronization source candidate(s), within every defined period set by a reselection timer, according to a following priority order:
      first, a UE that is the synchronization source candidate being in-coverage and having a highest result of the measured quality;
      second, a UE that is the synchronization source candidate having transmitted the synchronization signal, which is a network originated signal, and having a highest result of the measured quality; and
      third, a UE that is the synchronization source candidate being out-of-coverage and having transmitted the synchronization signal, which is a network independent signal, and having a highest result of the measured quality; and
   uses the synchronization signal of the selected synchronization reference UE to adjust timing of transmission or reception of data.

2. The user equipment according to claim 1, wherein the user equipment comprises a transmitter which transmits a synchronization signal generated at the user equipment responsive to the circuitry determining the user equipment is out-of-coverage and determining no synchronization source candidate.

3. The user equipment according to claim 1, wherein the circuitry, in operation, determines whether the received synchronization signal is a network originated signal or a network independent signal based on the received synchronization signal.

4. The user equipment according to claim 1, wherein the circuitry, in operation, measures the quality of the received synchronization signal based on a received power wherein the defined threshold is a defined hysteresis.

5. The user equipment according to claim 1, wherein the circuitry, in operation, adjusts the timing of reception or transmission within every defined period.

6. The user equipment according to claim 1, wherein the defined threshold is preconfigured on the user equipment.

7. The user equipment according to claim 1, wherein the circuitry, in operation, uses another defined threshold different from the defined threshold.

8. A method performed by a user equipment comprising:
   receiving a synchronization signal from a synchronization source;
   measuring a quality of the received synchronization signal;
   determining the synchronization source as a synchronization source candidate when the measured quality exceeds a defined threshold;
   periodically selecting a synchronization reference User Equipment (UE) from among the synchronization source candidate(s), within every defined period set by a reselection timer, according to a following priority order:
      first, a UE that is the synchronization source candidate being in-coverage and having a highest result of the measured quality;
      second, a UE that is the synchronization source candidate having transmitted the synchronization signal, which is a network originated signal, and having a highest result of the measured quality; and
      third, a UE that is the synchronization source candidate being out-of-coverage and having transmitted the synchronization signal, which is a network independent signal, and having a highest result of the measured quality; and using the synchronization signal of the selected synchronization reference UE to adjust timing of transmission or reception of data.

9. The method according to claim 8, which comprises transmitting a synchronization signal generated at the user equipment when the user equipment determines it is out-of-coverage and determines no synchronization source candidate.

10. The method according to claim 8, wherein whether the received synchronization signal is a network originated signal or a network independent signal is determined based on the received synchronization signal.

11. The method according to claim 8, wherein the quality of the received synchronization signal is measured based on a received power wherein the defined threshold is a defined hysteresis.

12. The method according to claim 8, wherein the timing of reception or transmission is adjusted within every defined period.

13. The method according to claim 8, wherein the defined threshold is preconfigured on the user equipment.

14. The method according to claim 8, which comprises using another defined threshold different from the defined threshold.

\* \* \* \* \*